Dec. 4, 1934.  W. A. DRY  1,983,444

PNEUMATIC PUMP AND JACK

Filed March 22, 1934

Inventor
William A. Dry
By Miller & Miller
Attorneys

Patented Dec. 4, 1934

1,983,444

UNITED STATES PATENT OFFICE

1,983,444
PNEUMATIC PUMP AND JACK
William Alfred Dry, Hodge, La.
Application March 22, 1934, Serial No. 716,870

8 Claims. (Cl. 254—86)

This invention relates to a pneumatic pump and jack and has for an object to provide a pneumatic pump and jack intended for use on vehicles and especially intended for motorcycles to be integrally constructed within the framework of the vehicle or the motorcycle.

A further object of this invention is to provide a jack integrally constructed inside of the frame of the vehicle or motorcycle which is capable of being operated to raise one end of the vehicle or motorcycle by the operation of a pumping lever and which further is capable of supplying air under pressure for pumping the pneumatic tire of the vehicle or motorcycle.

A further object of this invention is to provide a pneumatic jack which is built into the front skeleton of the motorcycle frame so that little if any extra space is necessary in having the jack always available and which is quickly convertible by the addition of an air hose for use as a pump to supply air pressure wherever needed especially in pumping the tire either of the vehicle on which it is carried or of any other vehicle along side which the motorcycle carrying this jack may be placed.

A further object of this invention is to provide means for preventing any vibration either of the lifting cylinder or of the pumping lever while the vehicle is in motion.

Although this combination pneumatic pump and jack is shown and described as being built in within the framework of a motorcycle, it will be understood that in its broader aspects this invention may be applied to automobiles or other similar types of vehicles, including for instance the strut on the landing wheels of an aeroplane.

Figure 1:
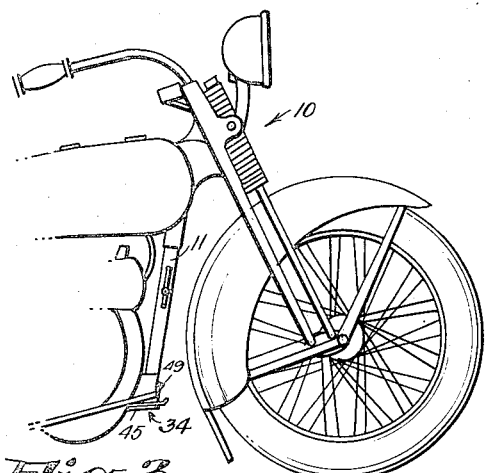
Figure 2:
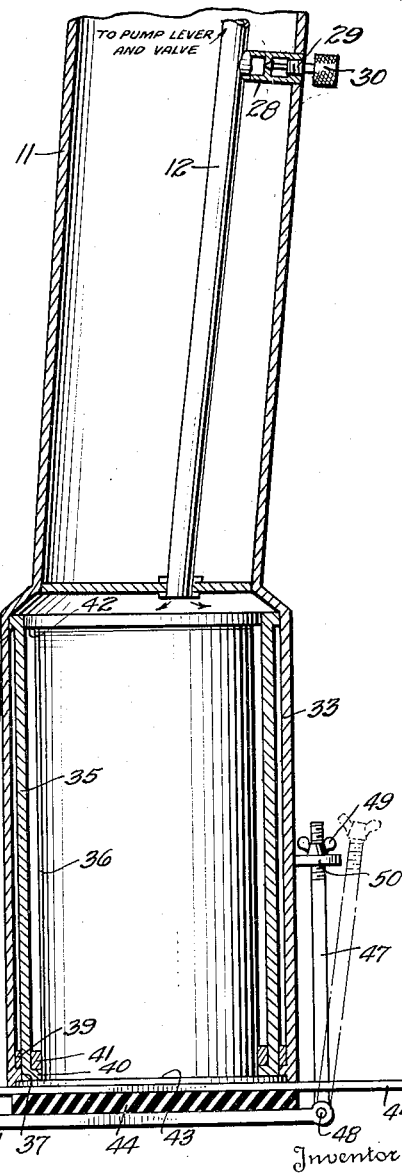
Figure 3:
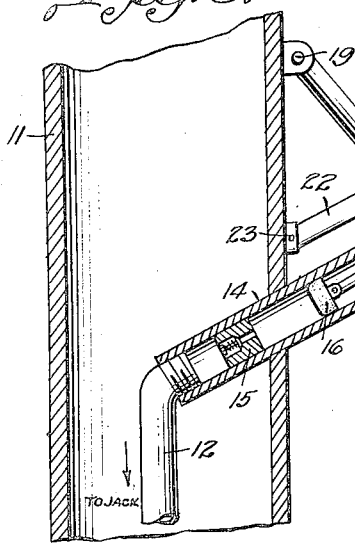
Figure 4:
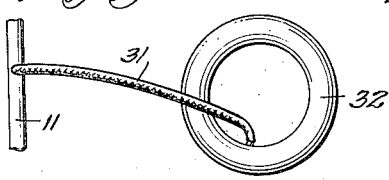

With the foregoing and other objects in view, as will hereinafter become apparent, this invention comprises the constructions, combinations and arrangements of parts hereinafter set forth, disclosed and shown on the accompanying drawing. In this drawing, Figure 1 is an elevational side view of the front portion of a motorcycle to which this invention has been applied, Figure 2 is a sectional view through the front skeleton of the motorcycle showing the built in pneumatic pump forming part of this invention, Figure 3 is a sectional view of the jack holding portion showing the pumping lever, and Figure 4 is a diagrammatic view showing the invention used as a pump for a pneumatic tire.

There is shown at 10 the front portion of a motorcycle having a front frame or skeleton 11 to which this invention has been applied. Extending through the length of the skeleton 11 is a section of a pneumatic conduit or tubing 12 of suitable material to withstand and carry the air pressure that will be sent therethrough. One end of this tubing 12 is secured in a pipe 14 extending through the side of the framework or skeleton 11 of the motorcycle 10, it being observed from Figure 1 that this extends preferably toward one side of the motorcycle. This pipe or tubing 14 contains an air valve 15 so as to permit air to travel therethrough in one direction only towards the conduit 12. A pump piston 16 is pivotally secured by a connecting rod or piston rod 17 to a handle lever 18, the lever 18 being pivoted as at 19 to a boss on the skeleton 11.

The other end of the lever 18 is formed into a socket 20 so as to removably receive an extension lever 21 so as to increase the leverage effect, assisting in easy manual manipulation thereof. As will be apparent, operating the hand lever 21 back and forward about the pivot 19 will cause the piston 16 to pump air through the valve 15 into the conduit 12. To hold the lever 18 against vibration when not in use a holding arm 22 is pivoted as at 23 to a boss on the skeleton 11 and has a reduced arm 24 which may be inserted through an appropriately located aperture through the lever 18. Vibration springs 25 and 26 are placed in the reduced arm 24 on each side of the lever 18 and a nut 27 holds the springs 25 and 26 in operative position while the vehicle is in motion. To make use of the pump, it is necessary to remove the nut 27 and springs 25 and 26 and then pivot the lever 21 so as to withdraw the reduced arm 24 from the aperture in the lever 18 to place the lever 18 into operative pumping position.

The conduit 12 is provided with an escape valve or shutter 28 leading to the side of the skeleton 11 and closed off by a threaded closure cap 29, having a knurled knob 30 secured thereto for easy manipulation. This escape valve 28 serves a double function. A pneumatic tube 31 of any desired length may be threaded into this escape valve 28 and its other end secured to the valve of a pneumatic tire 32 or any other suitable position where air pressure is desired. With the pneumatic tube 31 in operative position the pump then serves to pump air through the tube 31. This escape valve 28 also serves to allow the pneumatic jack about to be described to be relieved of the air pressure therein for lowering the same.

The tube or conduit 12 as shown leads to the bottom of the skeleton 11 into the outer cylinder 33 of the jack 34. This jack 34 consists of this outer cylinder 33, an intermediate cylinder 35, and an inside cylinder 36. The outer cylinder 33 is internally flanged at the bottom as at 37 and the intermediate cylinder 35 is externally flanged at the top as at 38. A compression washer 39 preventing leakage of any compression between the wall of the cylinders 33 and 35, and the flanges 38 and 37 limit the downward movement of this intermediate cylinder. Similarly, an internal flange 40 on the intermediate cylinder 35 cooperates with a compression washer 41 and an external flange 42 on the inside cylinder 36, the top of the inside cylinder being closed off to hold the air pressure thereagainst.

Secured to the bottom of the inside cylinder 36 is a closure member 43. Slidably extending through the closure member 43 is a foot 44 to extend the supporting area of the bottom of the jack. To hold the jack in inoperative position and proof against vibration while the vehicle is in motion, an arm 45, carrying a vibration absorbing pad 44', is pivoted to the motorcycle as at 46, and terminates in a rod 47 pivoted thereto as at 48 and carrying at its other end a wing nut 49 adapted to cooperate with a U-shaped boss 50.

As will be obvious when the wing nut 49 is secured on the threaded end of the rod 47 the arm 45 will tightly hold the vibration pad 44', against the bottom 43, holding the jack securely in inoperative position. In order to operate the jack the wing nut 49 is loosened allowing the rod 45 and pad 44' to be pivoted away thereunder, the nut 27 is removed allowing the pump lever 18 to be operated by the extension lever 21. Then by pumping the extension lever 21 back and forward toward the skeleton 11 with the escape or air shutter valve 28 closed by its cap 29, the air is pumped through the conduit 12 into the jack 34 moving the intermediate and inside cylinders to their lowermost position, raising the front end of the motorcycle 10.

When it is desired to lower the jack in order to lower the motorcycle the cap 29 is removed from the air shutter 28 allowing the air pressure within the jack 34 to escape through the conduit 12 and the air shutter 28 and allowing the inside and intermediate cylinders to be returned to their inoperative positions. In order to use the pump alone, the jack is left in inoperative position and the air tube 31 is secured to the tube 12.

The novel features and the operation of this device will be apparent from the foregoing description. While the device has been shown and the structure described in detail, it is obvious that this is not to be considered limited to the exact form disclosed, and that changes may be made therein within the scope of what is claimed without departing from the spirit of the invention.

Having thus set forth and disclosed the nature of this invention, what is claimed is:

1. A pneumatic pump and jack for a vehicle comprising a pneumatic jack member secured to the frame of a vehicle, a pump secured in the frame of a vehicle, a pneumatic tube connecting said pump and said jack, an air shutter or escape valve secured to said pneumatic tube, and means for holding said pump in inoperative position proof against vibration.

2. A pneumatic pump and jack for a vehicle comprising a pneumatic jack member secured to the frame of a vehicle, a foot extending through said jack member to increase the supporting area thereof, a pump secured in the frame of a vehicle, a pneumatic tube connecting said pump and said jack, an air shutter or escape valve secured to said pneumatic tube, and means for holding said jack in inoperative position proof against vibration.

3. A pneumatic pump and jack for a vehicle comprising a pneumatic jack member secured to the frame of a vehicle, a pump secured in the frame of a vehicle, a pneumatic tube connecting said pump and said jack, an air shutter or escape valve secured to said pneumatic tube, and means for holding said pump in inoperative position proofed against vibration, said means comprising an arm pivotally secured to the vehicle and cushioning means on said arm adapted to hold the pump therein.

4. A pneumatic pump and jack for a vehicle comprising a pneumatic jack member secured to the frame of a vehicle, a pump secured in the frame of a vehicle, a pneumatic tube connecting said pump and said jack, an air shutter or escape valve secured to said pneumatic tube, and means for holding said jack in inoperative position proofed against vibration, said means comprising an arm pivotally secured to the vehicle, a vibration absorbing pad secured on said arm, and means for securing said pivoted arm and said vibration pad under the bottom of said jack.

5. In combination with the front skeleton of a motorcycle; a pneumatic pump and jack comprising an outer cylinder formed on the bottom of the skeleton, an intermediate cylinder, flange means limiting the downward travel of said intermediate cylinder, and an inner piston, said inner piston being telescopically receivable within said intermediate cylinder and said intermediate cylinder being telescopically receivable within said outer cylinder, and means for securing said cylinders and piston in telescoped position.

6. In combination with the front skeleton of a motorcycle; a pneumatic pump and jack comprising an outer cylinder formed on the bottom of the skeleton, an intermediate cylinder, flange means limiting the downward travel of said intermediate cylinder and an inner piston within said intermediate cylinder, said inner piston being telescopically receivable within said intermediate cylinder and said intermediate cylinder being telescopically receivable within said outer cylinder, means for securing said cylinders and piston in telescoped position, said securing means comprising a hinged holding arm pivoted to the motorcycle framework and adapted to hinge about said jack, a vibration absorbing pad on said arm, and means for fastening said hinged holding arm to said outer cylinder, with said pad against said inner piston.

7. In combination with the front skeleton of a motorcycle; a pneumatic pump and jack comprising an outer cylinder formed on the bottom of the skeleton, an intermediate cylinder, flanged means limiting the downward travel of said intermediate cylinder and an inner piston within said intermediate cylinder, said inner piston being telescopically receivable within said intermediate cylinder and said intermediate cylinder being telescopically receivable within said outer cylinder, means for securing said cylinders and piston in telescoped position, a pneumatic tube, one end extending through said skeleton to said outer cylinder, and a pump extending through a side of the skeleton, the other end of said tube being fastened to said pump.

8. In combination with the front skeleton of a motorcycle; a pneumatic pump and jack comprising an outer cylinder formed on the bottom of the skeleton, an intermediate cylinder, flanged means limiting the downward travel of said intermediate cylinder and an inner piston within said intermediate cylinder, said inner piston being telescopically receivable within said intermediate cylinder and said intermediate cylinder being telescopically receivable within said outer cylinder, means for securing said cylinders and piston in telescoped position, a pneumatic tube, one end extending through said skeleton to said outer cylinder, a pump extending through a side of the skeleton, the other end of said tube being fastened to said pump, and an air shutter extending through the skeleton to said tube intermediate its ends, and means whereby an air hose may be secured to said shutter.

WILLIAM ALFRED DRY.